I. P. Tice,
Cutter Head.
Nº 26,383. Patented Dec. 6, 1859.
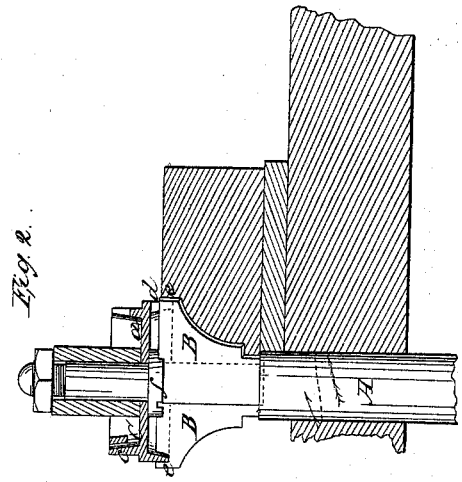
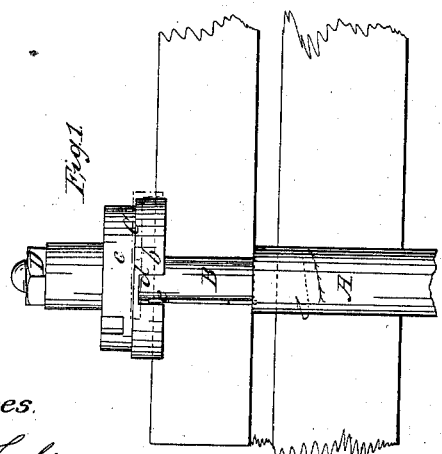
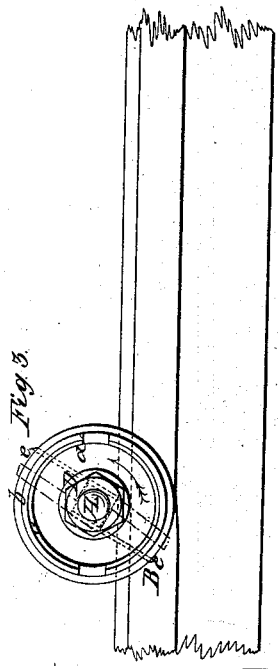
Witnesses.
Inventor.

UNITED STATES PATENT OFFICE.

I. P. TICE, OF BALTIMORE, MARYLAND.

ROTARY CUTTER-HEAD.

Specification of Letters Patent No. 26,383, dated December 6, 1859.

*To all whom it may concern:*

Be it known that I, I. P. TICE, of Baltimore, in the county of Baltimore and State of Maryland, have invented a new and useful Improvement in Rotary Cutter-Heads; and I do hereby declare that the following is a full, clear, and exact description of the same, reference being had to the annexed drawings, making a part of this specification, in which—

Figure 1 is an elevation of my invention. Fig. 2 is a vertical section of the same, Fig. 3 is a plan or top view of the same.

Similar letters of reference indicate corresponding parts in the several figures.

This invention consists in having the cutters placed in such relation with a cylinder or a segment of a cylinder as to prevent any undue action of the cutters on the "stuff" so that the former cannot follow the grain of the wood and draw it suddenly along thereby spoiling the work and endangering the hands of the operator.

The invention also has for its object a perfect operation of the cutters on the "stuff" so that the latter will be cut smooth and with a good finish and the cutters allowed to be adjusted on their arbor as the nature of the work may require, the invention serving as a guide for the setting thereof.

To enable those skilled in the art to fully understand and construct my invention I will proceed to describe it.

A, represents an arbor to which cutters B, B, are attached. These cutters may be of any proper form according to the character of the work, to be performed by them.

On the arbor A, directly above the cutters B, B, a hollow cylinder C, is placed. This cylinder has a partition $a$, at its center and one portion $b$, of the cylinder is larger in diameter than the other portion $c$, as shown clearly in Figs. 1 and 2. In these figures the lower part $b$, of the cylinder is the larger part and said part extends down between the cutters B, B, a sufficient distance, slots $d$, being made in the side of the cylinder to receive the top parts of the cutters, the edges $e$, $e$, of the cutters being allowed to project out from the periphery of the cylinder a requisite distance corresponding to the thickness of the shaving to be cut. The cylinder C, may extend down a greater or less distance between the cutters but in all cases it must extend down sufficiently to form a bearing for the "stuff" to be operated on. The partition $a$, of the cylinder C, rests on a collar $f$, secured to the arbor and this collar may be made adjustable by means of a screw thread on the arbor and an internal screw thread in the collar, or a series of washers may be used in order that the cylinder may be adjusted higher or lower. On the arbor A, and above the partition $a$, a nut D, is fitted by which the cylinder may be firmly secured down on the the collar or on the washers placed thereon.

From the above description it will be seen that the "stuff" to be operated on cannot be unduly acted upon by the cutters B, B, for the periphery of the cylinder C, serves as a bearing surface for the "stuff" and the cutters are prevented from gouging into the "stuff" a contingency due to an irregular grain and also to a tendency of the cutters to follow the grain when cutting against it.

Cutter heads that are not provided with any guard or shield frequently at certain parts of the "stuff" favorable for such a result penetrate the "stuff" so as to draw it rapidly and suddenly along and the hands of the operator are not unfrequently maimed thereby.

The cylinder C, is formed with two different sized diameters in order that the same cylinder may be applied to cutters of different lengths, that is to say, those that vary materially, more than can be compensated for by the adjustment allowed for them by their attachment to the arbor.

In order to apply the smaller portion $c$, of the cylinder to the cutters, the cylinder is merely inverted on the arbor. A series of these cylinders of various sizes corresponding to the length of the cutters may be kept on hand ready for use.

I am aware that a rotary cutter head has been provided with a guard or shield in order to effect the same purpose as the within described invention, see patent granted to Lewis M. Berry bearing date July 22, 1856, but in the latter case the cutters are fitted in a solid head, or segments are fitted between the cutters so as to virtually form a solid head conforming inversely to the shape of the pattern to be cut on the "stuff." This device admits of no variety of cutters being used with the same guard or shield, $a$, in other words each cutter has necessarily a guard or shield made expressly for it and the expense attending this precludes their general adoption.

My invention it will be seen is capable of very general application for the same cylinder may be applied to cutters of different form for all that is required is, to allow the cylinder to project down a little distance between the cutters in order to form the bearing for the "stuff" as previously described.

A complete cylinder C, as herein described would be preferable, but a segment of a cylinder would answer, a bearing surface being obtained near the cutting edge $e$, of each cutter as shown by the blue lines in Figs. 1 and 3. I therefore do not confine myself to a cylinder as a segment or section thereof would answer although not as perfectly as an entire cylinder and these segments may have a comparatively small bearing surface like a narrow vertical line, but in the latter case the work performed by the cutters would not be so smooth and quite inferior as regards finish compared with the work performed by the cutters provided with the entire cylinder.

I do not claim broadly the employment or use of a guard or shield applied to a rotary cutter head irrespective of the arrangement herein shown, but, I do claim as new and desire to secure by Letters Patent—

The employment or use of a cylinder C, or any segment or section thereof applied to rotary cutters to operate substantially as and for the purpose set forth.

I. P. TICE.

Witnesses:
J. W. COOMBS,
R. S. SPENCER.